United States Patent [19]

Secreto

[11] 4,149,800
[45] Apr. 17, 1979

[54] PHOTO EASEL

[76] Inventor: William A. Secreto, 308 Wren Dr., Greensburg, Pa. 15601

[21] Appl. No.: 887,236

[22] Filed: Mar. 16, 1978

[51] Int. Cl.² ............................................. G03B 27/58
[52] U.S. Cl. ...................................... 355/72; 354/275
[58] Field of Search .................. 355/72, 74; 40/158 R

[56] References Cited

U.S. PATENT DOCUMENTS

| | | | |
|---|---|---|---|
| 2,056,279 | 10/1936 | Kulick | 355/72 X |
| 2,112,838 | 4/1938 | Griffin | 355/72 |
| 2,488,434 | 11/1949 | Pratt et al. | 355/72 X |
| 2,495,061 | 1/1950 | Hanson | 355/72 |
| 2,589,094 | 3/1952 | Konopka | 355/74 |
| 2,718,812 | 9/1955 | Nitz | 355/74 X |
| 3,308,713 | 3/1967 | Miller | 355/72 X |
| 3,319,555 | 5/1967 | Jennings et al. | 355/72 X |
| 3,644,036 | 2/1972 | Canfield | 355/72 X |

*Primary Examiner*—Richard A. Wintercorn
*Attorney, Agent, or Firm*—Daniel Jay Tick

[57] ABSTRACT

A plurality of tabs extend perpendicularly from the front of a flat rectangular parallelepiped box of opaque material which stores a plurality of sheets of photographic paper. A frame member has a plurality of notches formed therein for accommodating the tabs of the box for guiding the frame member into position to maintain a sheet of photographic paper in position on the front of the box.

1 Claim, 2 Drawing Figures

PHOTO EASEL

BACKGROUND OF THE INVENTION

The present invention relates to a photo easel. More particularly, the invention relates to a photo easel for maintaining photographic enlarging paper in position for exposure in making enlargements.

Photoeasels of the type described herein are disclosed in the following United States patents. U.S. Pat. No. 1,452,996, issued to Baker on Apr. 24, 1923, U.S. Pat. No. 2,589,094, issued to Konopka on Mar. 11, 1952, U.S. Pat. No. 2,718,812, issued to Nitz on Sept. 27, 1955, U.S. Pat. No. 3,418,049, issued to Whitelatch on Dec. 24, 1968, U.S. Pat. No. 3,470,644, issued to Craig on Oct. 7, 1969 and U.S. Pat. No. 3,667,844, issued to Pittman on June 6, 1972.

Objects of the invention are to provide a photo easel of simple structure, which is inexpensive in manufacture, used with facility and convenience, and functions efficiently, effectively and reliably for a photographer to focus, crop and practice technique under an enlarger, save paper, enable multisized prints to be made on a single sheet of paper, permit the use of as many masks as desired to provide versatility and to act as a photographic copyboard, print frame, contact sheet printer, artist's easel and drawing board.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
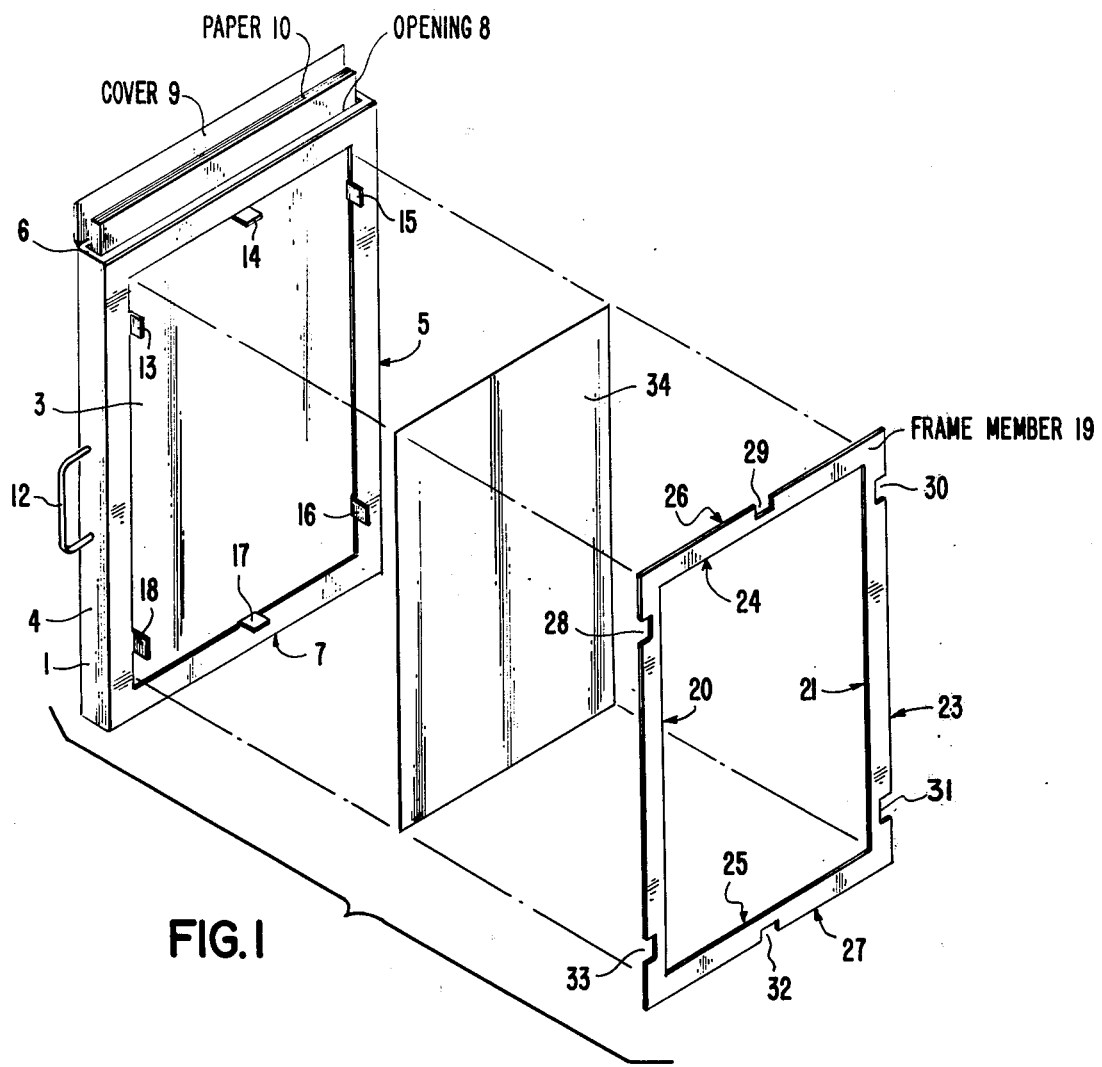
FIG. 1 is an exploded perspective view of an embodiment of the photo easel of the invention.

The photo easel of the invention functions to maintain photographic enlarging paper in position for exposure in making enlargements.

The photo easel of the invention comprises a substantially flat rectangular parallelepiped box 1 of opaque material of any suitable type. The box 1 has a back 2 (FIG. 2), a front 3 (FIGS. 1 and 2) parallel to the back and a first pair of sides 4 and 5 parallel to each other and perpendicular to the front and back.

The box 1 also has a second pair of sides 6 and 7 (FIG. 1) parallel to each other and perpendicular to the front, back and first pair of sides 4 and 5. The side 6 of the second pair of sides has an opening 8 therethrough extending along the length thereof. The box 1 has an opaque cover 9 spring-biased hingedly affixed to the back 2 of the box for selectively opening and closing the opening 8 whereby a plurality of sheets of photographic paper 10 are storable in the box. The cover 9 is affixed to the back 2 of the box 1 by any suitable hinge arrangement, of which one spring-loaded hinge 11 is shown in FIG. 2. The hinge has a spring on its pivot pin which urges the cover 9 to close, so that when said cover is opened, the hinges automatically close it in the absence of a counterforce.

A handle 12 extends from the side 4 of the first pair of sides.

Figure 2:
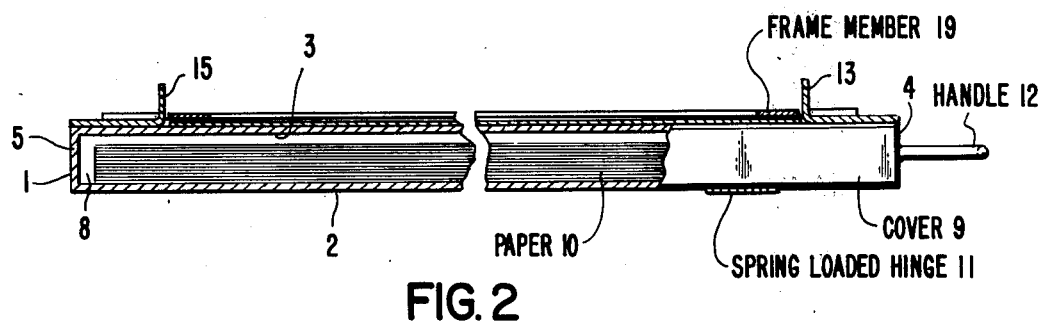
FIG. 2 is a view, on an enlarged scale, partly cutaway and partly in section, of the embodiment of FIG. 1 in assembled condition.

A plurality of tabs 13, 14, 15, 16, 17 and 18 extend substantially perpendicularly from the front 3 of the box 1 (FIG. 1). The tab 13 extends substantially parallel to the side 4 of the first pair of sides, as shown in FIGS. 1 and 2. The tab 15 extends substantially parallel to the other side 5 of the first pair of sides, as shown in FIGS. 1 and 2. The tab 14 extends substantially parallel to the side 6 of the second pair of sides, as shown in FIG. 1. The tab 17 extends substantially parallel to the other side 7 of the second pair of sides, as shown in FIG. 1. A tab 18 is preferably provided, extending substantially parallel to the side 4 and a tab 16 is preferably provided extending substantially parallel to the side 5 of the first pair of sides, as shown in FIG. 1.

The tabs 13 and 18 are in parallel spaced relation, as are the tabs 15 and 16. The tab 14 is spaced from the tabs 13 and 15 and extends perpendicularly thereto. The tab 17 is spaced from the tabs 18 and 16 and extends perpendicularly thereto.

A frame member 19 of hollow rectangular configuration has a first pair of parallel inner edges 20 and 21, a first pair of parallel outer edges 22 and 23 parallel to the first pair of inner edges, a second pair of parallel inner edges 24 and 25 perpendicular to the first pairs of inner and outer edges and a second pair of parallel outer edges 26 and 27 perpendicular to the first pairs of inner and outer edges and parallel to the second pair of inner edges, as shown in FIG. 1. The frame member 19 has a plurality of notches 28, 29, 30, 31, 32 and 33 formed therein at the first and second pairs of outer edges 22 and 23, and 26 and 27, respectively.

The notches 28 to 33 formed in the frame member 19 accommodate the tabs 13 to 18, respectively, of the box 1 for guiding said frame member into position to maintain a sheet of photographic paper 34 (FIG. 1) in position on the front 3 of said box. As shown in FIG. 1, the outer edge 22 of the frame member 19 has the notches 28 to 33 formed therein and the outer edge 23 of said frame member has the notches 30 and 31 formed therein. The outer edge 26 of the frame member 19 has the notch 29 formed therein and the outer edge 27 of said frame member has the notch 32 formed therein. The notch 28 accommodates the tab 13. The notch 29 accommodates the tab 14. The notch 30 accommodates the tab 15. The notch 31 accommodates the tab 16. The notch 32 accommodates the tab 17. The notch 33 accommodates the tab 18.

While the invention has been described by means of a specific example and in a specific embodiment, I do not wish to be limited thereto, for obvious modifications will occur to those skilled in the art without departing from the spirit and scope of the invention.

I claim:

1. A photo easel for maintaining photographic enlarging paper in position for exposure in making enlargements, said photo easel comprising a substantially flat rectangular parallelepiped box of opaque material having a back, a front parallel to the back, a first pair of sides parallel to each other and perpendicular to the front and back and a second pair of sides parellel to each other and perpendicular to the front, back and first pair of sides, one of the second pair of sides having an opening therethrough extending along the length thereof, said box having an opaque cover spring-biased hingedly affixed to the back of the box for selectively opening and closing said opening whereby a plurality of sheets of photographic paper are storable in the box;

a handle extending from one of the first pair of sides;

a plurality of tabs extending substantially perpendicularly from the front of the box, a first of the tabs extending substantially parallel to one of the first pair of sides, a second of the tabs extending substantially parallel to the other of the first pair of sides, a third of the tabs extending substantially parallel to one of the second pair of sides and a fourth of the tabs extending substantially parallel to the other of the second pair of sides; and a frame member of hollow rectangular configuration having a first pair of parallel inner edges, a first pair of parallel outer edges parallel to the first pair of inner edges, a second pair of parallel inner edges perpendicular to the first pairs of inner and outer edges and a second pair of parallel outer edges perpendicular to the first pairs of inner and outer edges and parallel to the second pair of inner edges, said frame member having a plurality of notches formed therein at the first and second pairs of outer edges thereof for accommodating the tabs of the box for guiding the frame member into position to maintain a sheet of photographic paper in position on the front of the box.

* * * * *